(12) United States Patent
Lu et al.

(10) Patent No.: US 8,180,165 B2
(45) Date of Patent: May 15, 2012

(54) ACCELERATED SCREEN CODEC

(75) Inventors: Yan Lu, Beijing (CN); Huifeng Shen, Beijing (CN); Feng Wu, Beijing (CN); Shipeng Li, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 816 days.

(21) Appl. No.: 12/340,410

(22) Filed: Dec. 19, 2008

(65) Prior Publication Data
US 2010/0158400 A1 Jun. 24, 2010

(51) Int. Cl.
*G06K 9/36* (2006.01)
(52) U.S. Cl. .......... 382/236; 375/240.1; 375/240.24
(58) Field of Classification Search .......... 382/232–253; 375/240.1–241
See application file for complete search history.

(56) References Cited

U.S. PATENT DOCUMENTS

| | | | |
|---|---|---|---|
| 5,696,842 A * | 12/1997 | Shirasawa et al. | 382/176 |
| 5,742,704 A * | 4/1998 | Suzuki et al. | 382/176 |
| 6,404,919 B1 * | 6/2002 | Nishigaki et al. | 382/176 |
| 6,625,323 B2 * | 9/2003 | Henderson et al. | 382/251 |
| 7,218,784 B1 * | 5/2007 | Zeck et al. | 382/232 |
| 7,295,208 B2 | 11/2007 | White et al. | |
| 2005/0135693 A1 * | 6/2005 | Ahmed et al. | 382/251 |
| 2006/0056708 A1 | 3/2006 | Shen et al. | |
| 2007/0189603 A1 | 8/2007 | Kasperkiewicz et al. | |
| 2007/0201562 A1 | 8/2007 | Ganesh et al. | |
| 2007/0201751 A1 * | 8/2007 | Wu et al. | 382/232 |
| 2008/0074431 A1 | 3/2008 | Bakalash et al. | |
| 2009/0324109 A1 * | 12/2009 | Johnston | 382/232 |

OTHER PUBLICATIONS

"GPU-Accelerated Dirac Video Codec", Retrieved at <<http://www.cs.rug.nl/~wladimir/sc-cuda/>>, Oct 24, 2008, pp. 1-2.
Mather Alexis, "GPU-Acelerated Video Encoding", Retrieved at <<http://ati.amd.com/products/firepro/Siggraph_2008_video_encode_final.pdf>>, pp. 38.
"Windows Imaging Component Codec Guidelines for RAW Image Formats", Retrieved at <<http://download.microsoft.com/download/9/c/5/9c5b2167-8017-4bae-9fde-d599bac8184a/RAWcodec_guide.doc>>, Nov. 6, 2006, pp. 15.
Dipert Brian, "Instigating a Platform Tug of War: Graphics Vendors Hunger for CPU Suppliers' Turf", Retrieved at <<http://www.edn.com/index.asp?layout=article&articleid=CA6262535>>, Oct. 13, 2005, pp. 1-11.
Thrane et al., "A Comparison of Acceleration Structures for GPU Assisted Ray Tracing", Retrieved at <<http://larsole.com/files/GPU_BVHthesis.pdf>>, Aug. 1, 2005, pp. 109.

* cited by examiner

*Primary Examiner* — Jingge Wu
(74) *Attorney, Agent, or Firm* — Lyon & Harr, LLP; Katrina A. Lyon

(57) ABSTRACT

An accelerated screen codec technique is described that provides a general screen compression framework, which, in one embodiment, is Graphics Processor Unit (GPU) friendly. In one embodiment, in order to compress screen data, blocks in a compound screen image containing both images and text are segmented into text blocks and pictorial blocks using a simple gradient-based procedure. The text and pictorial blocks are then compressed respectively via different compression techniques. Additionally, a GPU acceleration architecture of one embodiment of the accelerated screen codec technique provides a screen codec that maximally exploits a GPU's high parallelism and reduces the download bandwidth from GPU to Computer Processing Unit (CPU).

20 Claims, 9 Drawing Sheets

ACCELERATED SCREEN CODEC

BACKGROUND

Real-time screen capture systems are widely demanded in many scenarios such as, for example, remote desktop applications, wireless projectors, software training manuals, and network game sharing. Screen content displayed may contain a wide category of data types including graphics, text, video and user-designed drawings. Compression of such varied screen content usually involves complicated computations such as segmentation and transformation. These operations inevitably pose a heavy burden on the processing powers of most computing devices.

Bandwidth cost is another challenging issue for real-time screen capture systems. Bandwidth is expensive and its growth has been much slower than that of processing capability. In particular, in a typical computer, the transfer rate from video memory to system memory is much smaller than the reverse, since only the transfer direction from system memory to video memory is optimized by hardware acceleration devices. Thus, the downloading process from video memory to system memory usually becomes a bottleneck in real-time screen capture systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The accelerated screen codec technique described herein provides a general screen compression framework, which, in one embodiment, is Graphics Processor Unit (GPU) friendly. In one embodiment, in order to compress screen data, blocks of a compound screen image containing both images and text are segmented into text blocks and pictorial blocks using a simple gradient-based procedure. The text and pictorial blocks are then compressed via different compression techniques. Additionally, a GPU acceleration architecture of one embodiment of the accelerated screen codec technique provides a screen codec that maximally exploits a GPU's high parallelism and reduces the download bandwidth from GPU to Computer Processing Unit (CPU). The screen codec of the technique can achieve better performance in coding compound images than the current up-to-date image/video compression standard, in terms of both compression ratio and compression speed.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the accelerated screen codec technique, reference is made to the accompanying drawings, which form a part thereof, and which is shown by way of illustration examples by which the accelerated screen codec technique may be practiced. It is to be understood that other embodiments may be utilized and structural changes may be made without departing from the scope of the claimed subject matter.

1.0 Accelerated Screen Codec Technique

The screen capturing and coding technique described herein significantly out performs other screen capturing solutions in terms of overall user experiences. In particular, a screen compression framework is provided. In one embodiment of the technique, component technologies have been optimized in terms of GPU acceleration, and the framework is GPU friendly in implementation. Additionally, the technique provides a new architecture of an accelerated screen/video encoder. In the past, only video decoding algorithms have been implemented with GPU acceleration. The current technique provides GPU acceleration for screen encoding.

1.1 Exemplary Screen Codec Architecture

The following paragraphs describe an exemplary architecture for employing the accelerated screen codec technique.

1.1.1 Screen Compression Framework

Figure 1:
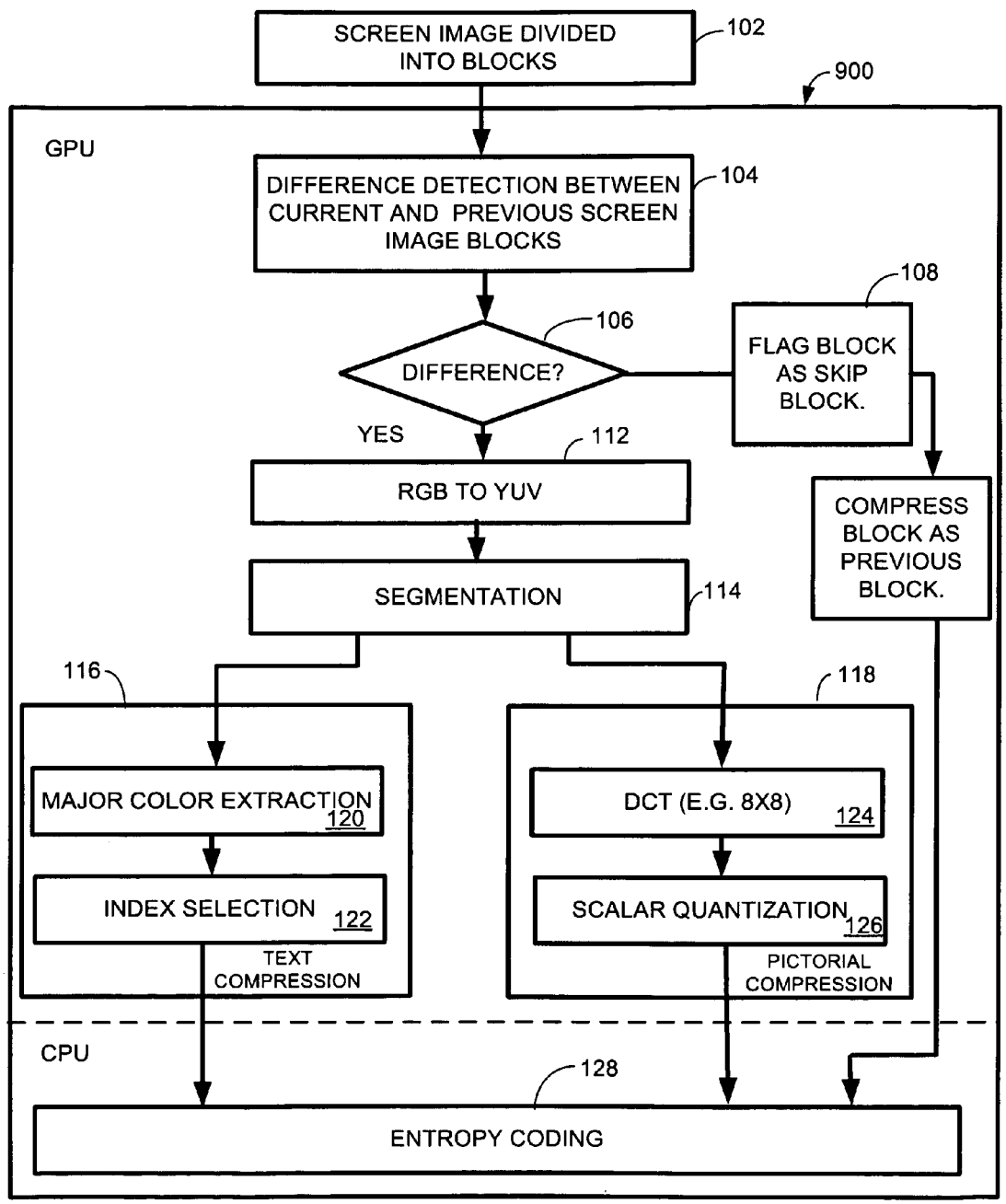
FIG. 1 is an exemplary architecture in which one embodiment of the accelerated screen codec technique can be employed.

One embodiment the accelerated screen codec technique described herein employs a block-based screen-compression solution for real-time screen capture. An exemplary architecture 100 of one embodiment for employing the technique's screen compression scheme is shown in FIG. 1. This architecture typically resides on a computing device 900 such as will be described in greater detail with respect to FIG. 9. Generally, a screen image split into un-overlapped blocks is input 102 (e.g., 16×16 blocks or macroblocks). A difference detection module 104 detects the difference between corresponding blocks from a previous screen image and blocks of the current screen image. If no difference is detected, then the block is flagged as a skip block and will be compressed like the corresponding previous block (106, 108, 110). (Note: If the input screen is in red green blue (RGB) format, it can optionally be converted to YUV format for much more efficient computation (block 112)). The blocks that are not flagged as skip blocks are then classified as text 116 or pictorial blocks 118 by a segmentation module 114 based on a pixel gradient technique which will be discussed in greater detail with respect to FIG. 4. In general, in the text block compression modules 116, text blocks are transformed into the spatial domain, major colors are extracted and these major colors are used to create an index map for compression 122. In the pictorial block compression module 118, pictorial blocks 120 are compressed by converting them using a Discrete Cosine Transform (DCT) 122 and a scalar quantizer 124 and using a JPEG compression like scheme. Therefore, each block type is efficiently compressed using different compression techniques. Once the blocks of the input screen image are compressed they can be entropy encoded 128.

An exemplary block encoding process, shown in FIG. 2, can be described as follows. A current screen image is input, as shown in block 202. The current screen image and a previous screen image are divided into blocks, as shown in block 204 and a set of corresponding blocks are selected for further processing (process action 206). A difference detection (block 208) is performed between corresponding blocks of the two screen images. Differences between the previous corresponding screen image and current screen image are used to determine how to compress a block. If there are no differences between corresponding the blocks, then the current screen image block is identified as a skip block, as shown in blocks 210, 212. Skipped blocks are not further processed, as shown in block 212. (Skipped blocks will be compressed in accordance with the block type of a previous block). Then segmentation or block type identification is performed to classify the non-skipped blocks into two types: text blocks and pictorial blocks, as shown in blocks 214, 216, 218, 220. For real time processing purposes, in one embodiment, the technique employs a simple but efficient segmentation algorithm based on pixel gradients to determine if a block is a text or pictorial block, which will be described below. Once the block type has been identified, the block type of each block is first compressed, and the block is then compressed in accordance with the method identified (skip, pictorial, text), until all blocks of the screen are processed, as shown in blocks 224, 226 and 228. In the decoding process the steps for each block are reversed. A block type of each block is first decompressed, and the block is then decompressed in accordance with the method identified (skip, pictorial, text), until all blocks of the screen are processed.

The pictorial blocks are easy to handle, since there are several known and mature image compression standards to encode pictorial blocks, such as JPEG and JPEG2000. In one embodiment, the technique uses a JPEG-like scheme to encode the pictorial blocks for simplicity. Considering the characteristics of text blocks and the real-time requirement, the technique employs a new procedure for text-block compression which will be also described below.

1.1.2 Block Type Identification

Figure 3:
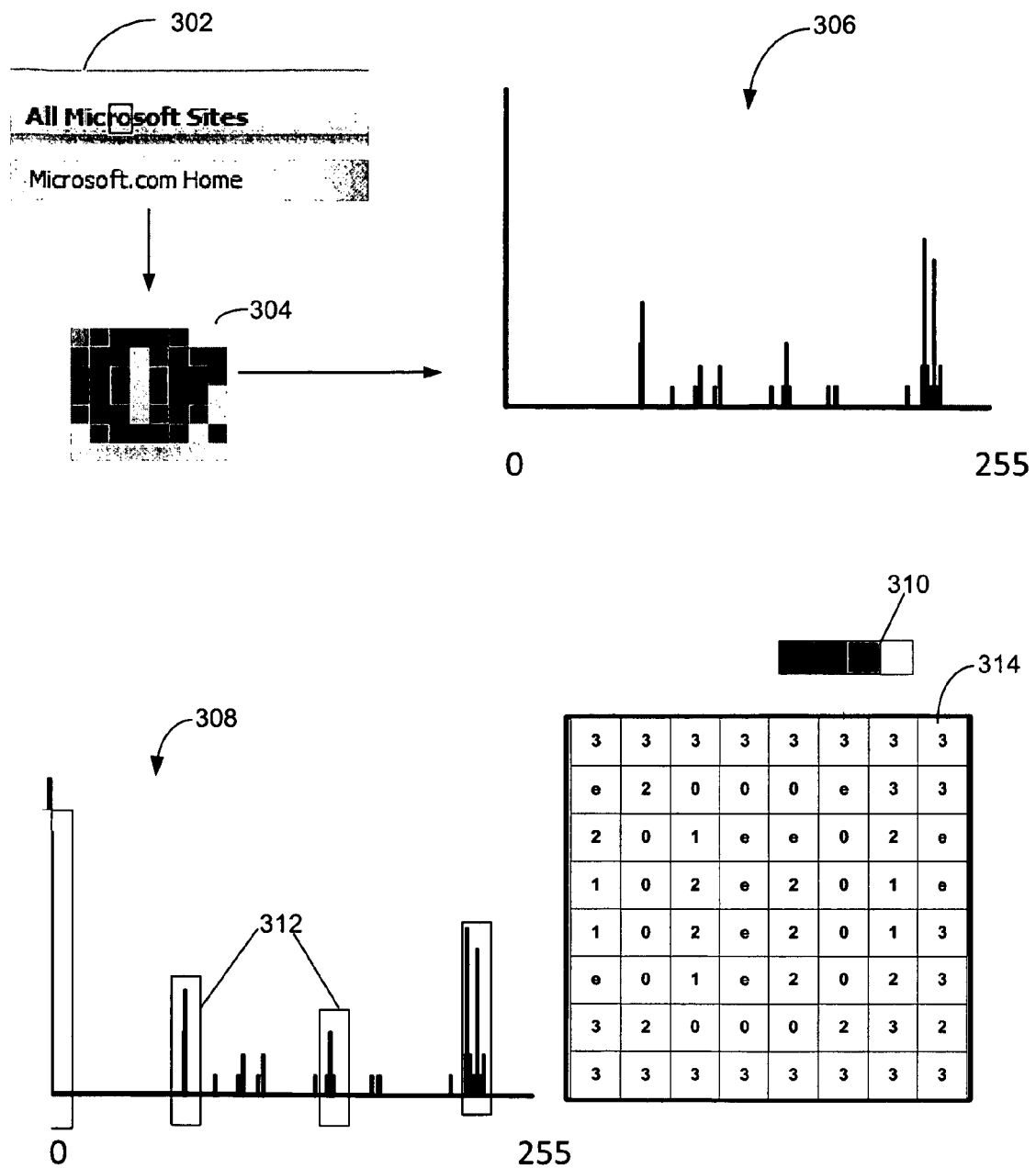
FIG. 3 is an illustration of text block coding: 1) the upper left depicts an exemplified text block; 2) the upper right depicts histograms within the block; 3) the lower left depicts major-color extraction based on histogramming; and 4) the lower right depicts major colors and a corresponding index map.

The previously mentioned gradient-based block type identification procedure is performed as described below. Generally, referring to FIG. 3, text content usually has sharp edges within blocks 304, which is shown in FIG. 3 upper left as an example. The gradient is a good measurement of the edge sharpness.

Figure 4:
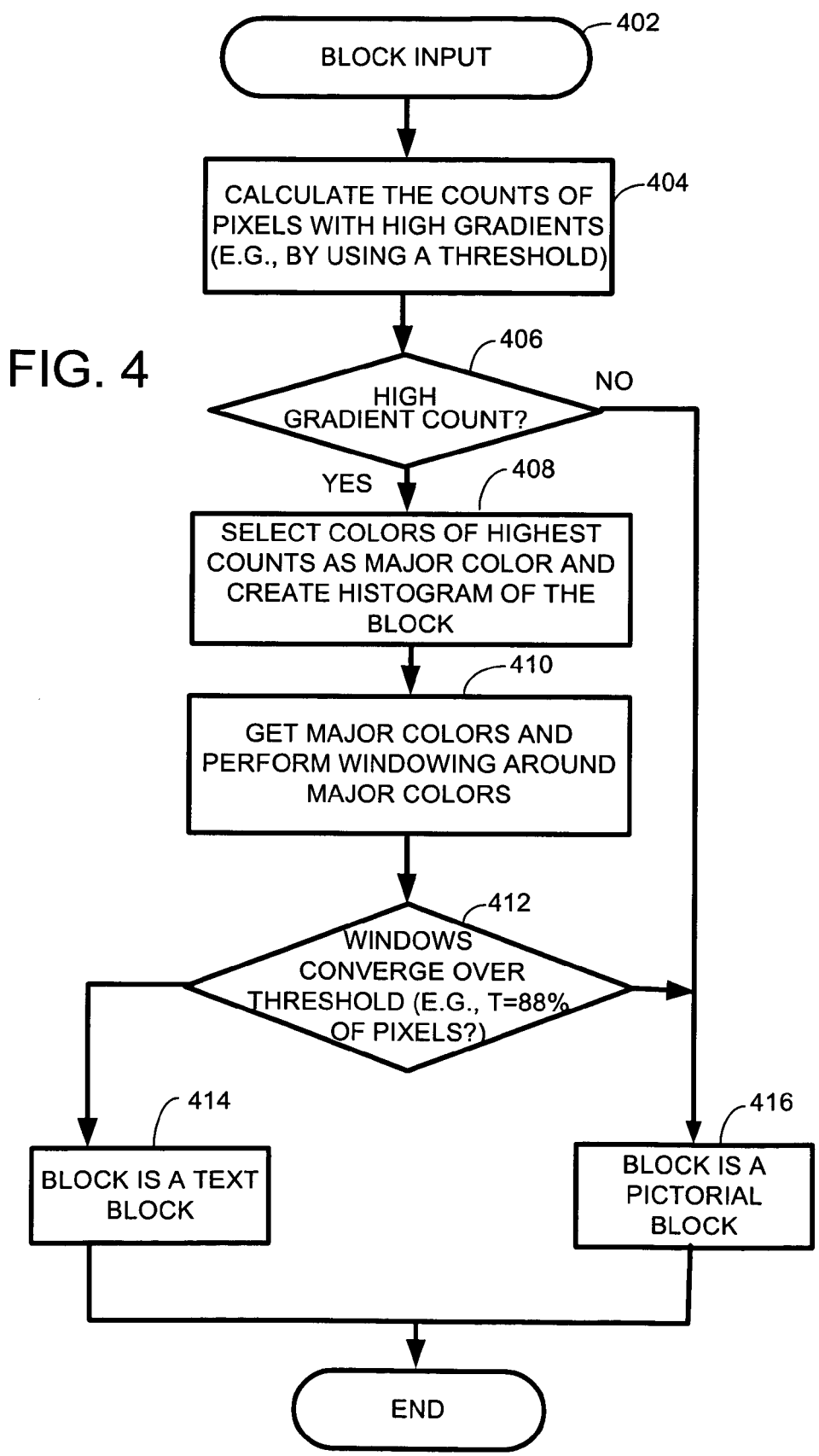
FIG. 4 is a flow diagram of an exemplary block type identification scheme employed in one embodiment of the accelerated screen codec technique.

The main purpose of block type identification, otherwise known as segmentation herein, is to determine whether a block (e.g., a macro block) is suitable to be compressed as a text block or a pictorial block. The flow chart of the one embodiment of the segmentation or block type identification scheme is shown in FIG. 4. In the technique's segmentation, given an input block 402, gradient values between the pixel and the surrounding pixels are first calculated, as shown in block 404. Relative high gradient values are selected by thresholding. If there are not a large (e.g., over a threshold) number of high gradient values, the block is designated as a pictorial block 416. If there are a large number of high gradient values, then the pixels with high-gradient within the block are counted to create histograms of the block, as shown in block 406. Colors with peak histogram values are selected as major colors. Then an equal-size window (in the histogram) is used to range the colors near major ones (block 410). If the number of high-gradient pixels within the block exceeds certain threshold, this block will be elected as the text block (blocks 412, 414), otherwise the block with be designated as a pictorial block (block 416).

1.1.2 Text Block Compression

Referring back to FIG. 3, if a block is identified as a text block it will be compressed in a manner suitable for text. Text content exhibits many different features from pictorial content. FIG. 3, upper left block 302, shows an exemplified text block 304. The histogram 306 for the text block 304 is shown in the upper right of FIG. 3. Some distinguishable features from pictorial content can be observed. For example, the edges are usually sharp. The sharp edges make a transform, (such as DCT)-domain representation, unsuitable for text block coding, because its energy will be scattered to many transform coefficients. On the other hand, from the histogram that is a spatial-domain representation 308, it can be seen that the number of the colors within the block is limited to a small number. Thus, it is more suitable to process the text content in spatial domain.

Based on the above observation, the technique employs a simple but efficient scheme to represent text blocks in the spatial domain, which consists of major colors 310 and an index map 314. Major color extraction is associated with the color quantization to minimize the display distortion based on the extracted limited-number colors. However, traditional color quantization methods, e.g., vector quantization and K-means, usually involve computationally expensive operations such as the clustering operation. Considering the desire for real time processing, the technique, in one embodiment, directly extracts the major colors based on the histogram. As can be seen from the histogram 308 in FIG. 3, a majority of pixels are convergent to a small number of colors or very near with these colors. Therefore, first, the colors with peak histogram values are selected as major colors. Then an equal-size window 312 in the histogram is used to range the colors near major ones, as shown in FIG. 3 bottom left. All the colors within the range are quantized to the major color in the same window. The number of the colors outside these windows is small and these will be PCM-coded into the final bitstream (These pixels are called escaped pixels, so "e" is used to indicate these in the index table 314 in FIG. 3 bottom right.) The color indices can be compressed with various methods (such as, for example, the method described in co-pending application Ser. No. 11/855075, entitled "Textual Image Coding" and filed on Sep. 13, 2007).

2.0 GPU Acceleration Architecture

One embodiment of the accelerated screen codec technique described herein employs a GPU to accelerate processing.

2.1 Graphics Rendering Pipeline

In this subsection, a brief overview of a graphics-oriented processing GPU pipeline is provided with an emphasis on the programmable vertex/pixel engine to explain how the 2D image processing/compression of the present technique maps to the graphics rendering pipeline.

Figure 5:
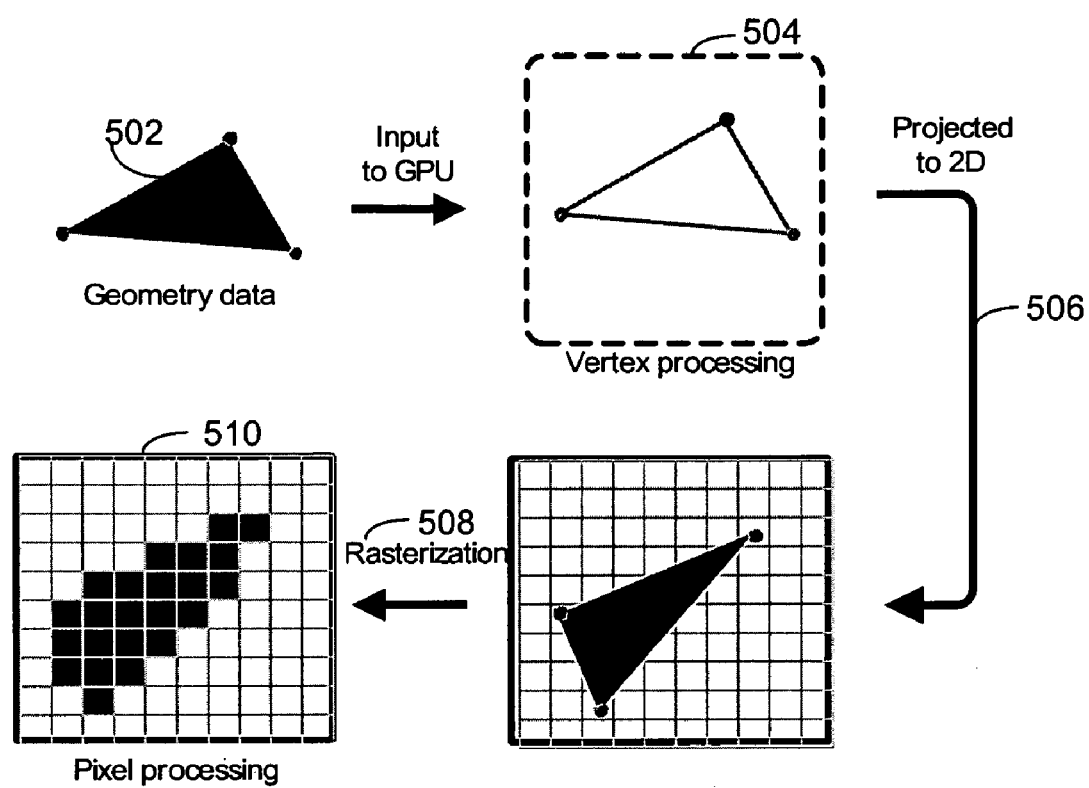
FIG. 5 is a diagram of an exemplary rendering pipeline of a typical graphics card.

FIG. 5 depicts a conventional (e.g., DirectX-9 compatible) rendering pipeline 500 equipped in the GPU. First, a user provides the GPU with geometry data 502 which usually describes the positions of the vertex and the texture coordinates associated with vertices of objects in a scene. Then the vertex processing engine 504 can process each vertex by executing a vertex shader (user-developed program for vertices) in an Single Instruction, Multiple Data (SIMD) fashion. Then polygons representing the objects are projected 506 and clipped to the view plane. The hardware performs rasterization 508 and generates pixel-level representations within polygons. Finally, the pixel processing engine 510 takes place via executing the pixel shader, also in an SIMD fashion.

Though the conventional rendering pipeline is specially designed for graphics applications, the technique facilitates image compression algorithms to run along the pipeline. The regular block used in image codecs can be depicted by two un-overlapping triangles representing the geometry data, and then the nature of the vertex concept is similar to block corner points. So some operations that are only dependent on a current corner point can be processed in the vertex shader. In addition, the pixel shader is more applicable to image/video codec than vertex shader since any per-pixel processing operations can be performed in the pixel processing engine.

2.2 Exemplary System Architecture of One Working Embodiment

In one embodiment of the accelerated screen codec, the technique moves complicated compression operations to a GPU from a CPU to exploit the parallelism in the graphics pipeline. In this section, the work flow of an exemplary GPU-assisted screen capture system according to the accelerated screen codec technique will first be described and then the techniques used to fit the modules to SIMD fashions will be detailed.

Figure 6:
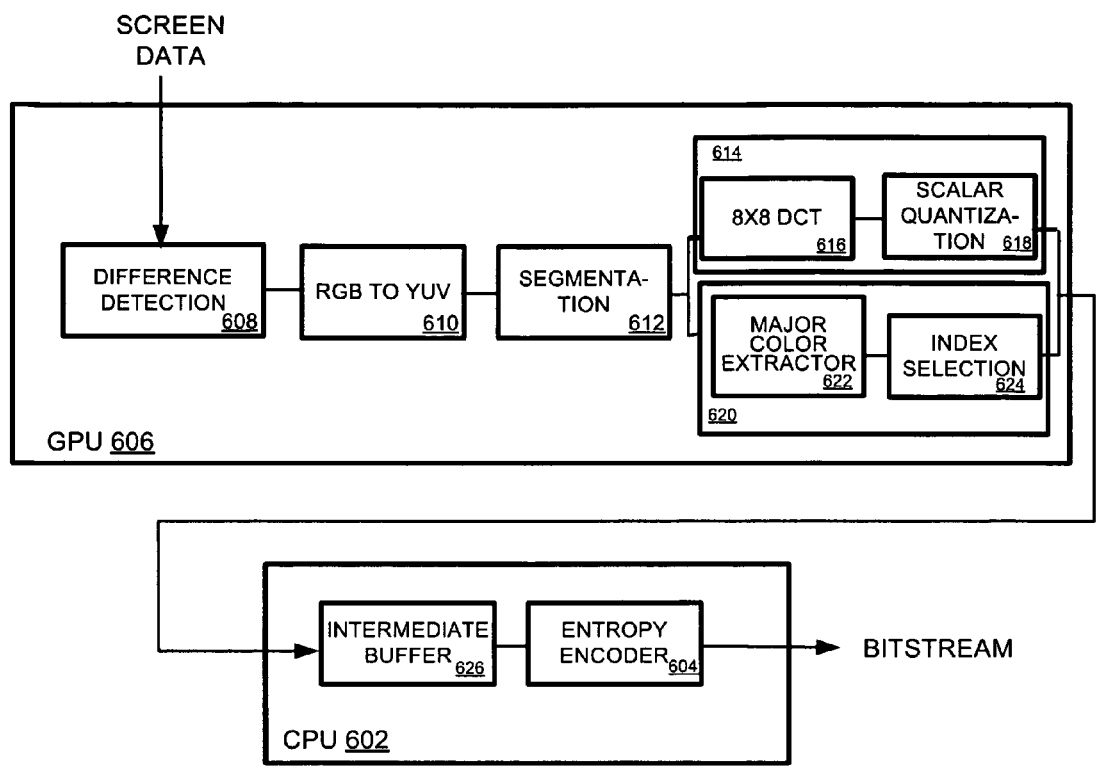
FIG. 6 provides a diagram of an exemplary graphics rendering pipeline employing the accelerated screen codec technique.

As shown in FIG. 6, in one embodiment, the technique offloads all modules except the entropy coder 604 into GPU 606. The entropy coder 602 consists of sequential bit-wise operations, which are hard to implement as sub-operations with no intermediate sharing values. Thus, as a result, screen compression is split into two successive tasks, GPU-implemented pre-compression and CPU-based entropy coding. The pre-compression which occurs in the GPU 606 reads and stores the input screens as textures in video memory and then a series of specially-designed rendering passes are performed to complete all of the operations prior to the entropy coding. Afterwards, the resultant textures, which consist of coded coefficients and the corresponding side information, are read back into system memory and are then ready for entropy coding at the entropy coder 604. The two tasks are organized so that these can be parallelized. That is to say, while the entropy coder is doing the entropy-coding work for the current frame, the GPU pre-compressor can process the next frames.

3. GPU Acceleration Technologies 3.1 Difference Detection

Figure 2:
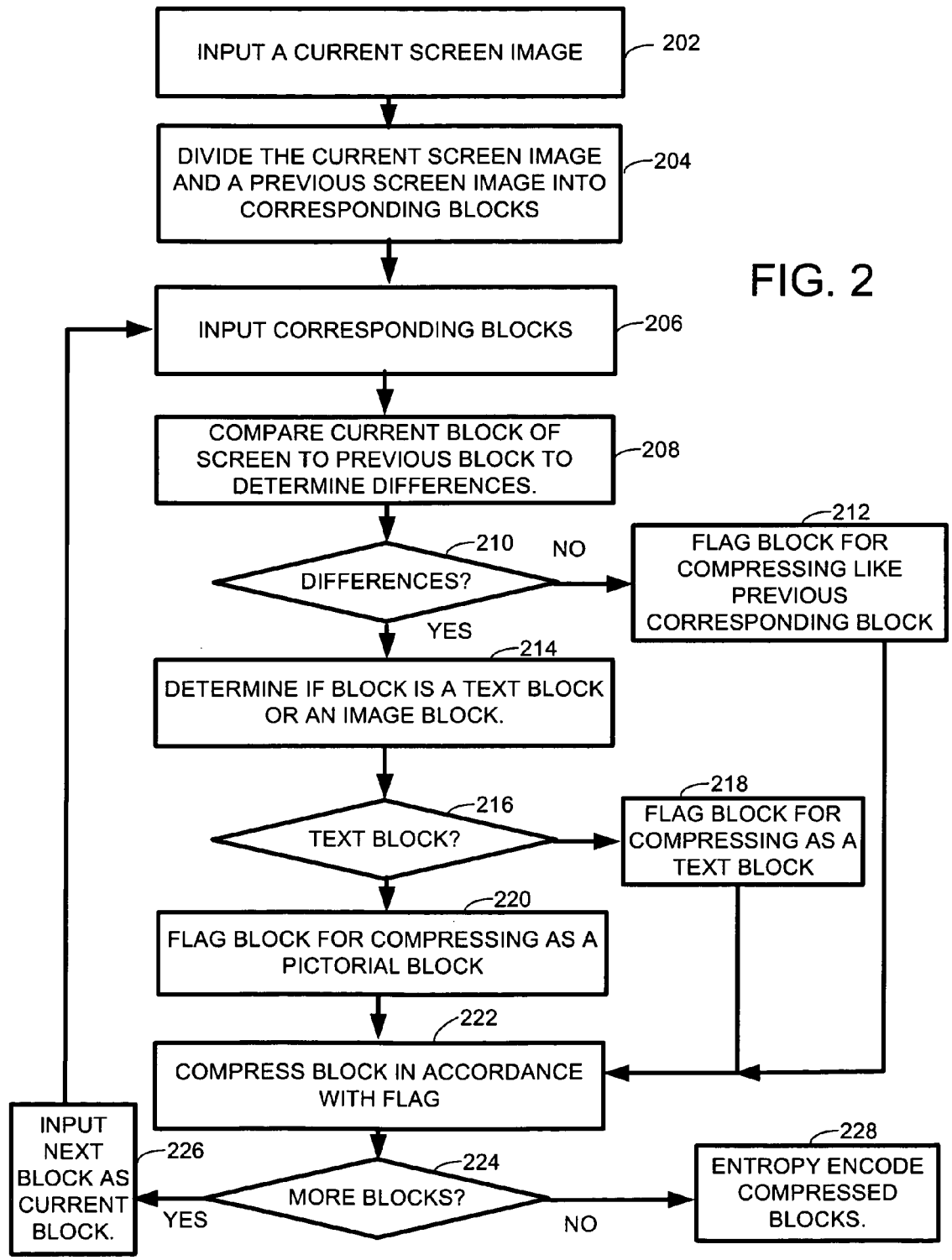
FIG. 2 is a flow diagram depicting a generalized exemplary embodiment of a process employing one embodiment of the accelerated screen codec technique.
Figure 7:
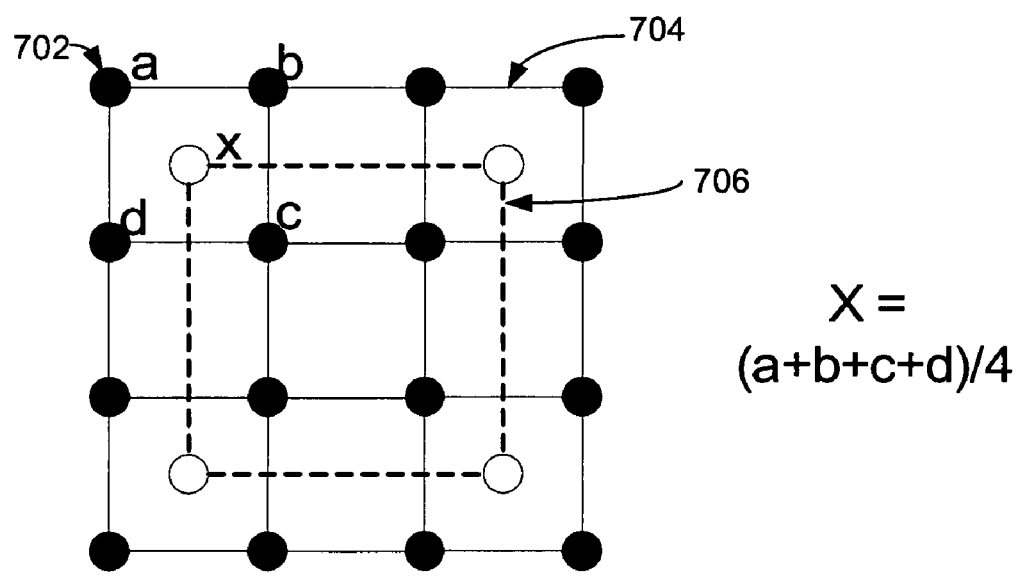
FIG. 7 depicts the correspondence between bilinear filtering and averaging employed in one exemplary embodiment of the accelerated screen codec technique.

Difference detection similar to that previously discussed with respect to FIGS. 1, 2 and 4, occurs in a difference detection module 608 of the GPU architecture employed by the technique shown in FIG. 6. Assuming two successive screens are stored in video memory as textures, the technique can use the pixel shader to perform per-pixel difference detection between these two screenshots, which in one working implementation of the technique just needs two texture-access instructions and one minus instruction in the pixel shader. After the minus operation between two images, the technique accumulates the differences within each block to determine whether the block can be encoded as a skip block. Since internal operations in the GPU use floating point, an averaging operation is mathematically equivalent to accumulation except magnitude minification. In this case, the technique only needs to know whether there are different pixels within the block, and the magnitude of the difference is not a concern. So, the technique can use an averaging operation to replace accumulation. Furthermore, averaging over 4 neighbored pixels can be taken as a special case of bilinear filtering when the expected pixel is located in the center of the quad, as shown in the top-left part 702 of FIG. 7. Fortunately, bilinear filtering in a GPU can be accelerated by 3D texturing hardware. Therefore, the difference accumulation within one block (e.g., a 16×16 block) can be performed by a sequential bilinear down-sampling to a one-by-one block. For example, FIG. 7 shows the bilinear down-sampling process from a 4×4 block 704 (the outside perimeter) to 2×2 block 706 (the inside perimeter indicated by a dashed line).

3.2 Block Type Identification

Block type identification occurs in a segmentation module 612 of the GPU architecture employed by one exemplary embodiment of the technique shown in FIG. 6. In a first rendering pass for segmentation, one embodiment of the technique calculates the gradients between the current pixel and the surrounding pixels and determines whether this pixel contains high gradient values. It can be implemented in the pixel shader of a GPU because these operations are per-pixel operations. Then the technique counts the number of the high-gradient pixels within the block. This accumulation process is similar to that in difference detection and can also utilize bilinear filtering. Finally, the text/pictorial blocks can be identified by thresholding the accumulation results.

3.3 Pictorial-Block Coding

Picture block coding occurs in a picture block compression module 614 of the GPU architecture employed by the technique shown in FIG. 6. Similar to conventional image compression, in one embodiment the technique uses chroma sub-sampling and the YUV 4:2:0 format for pictorial blocks (RGB screen data can be converted, for example to YUV format in the RGB to YUV module 610). Thus, in one embodiment, in one 16×16 block, 4 luminance and 2 chroma 8×8 DCTs 616 are employed, which are scheduled into the GPU as well as the following quantization 618. GPU-implemented DCT has been studied by several researchers/developers. The technique can employ conventional GPU implemented DCT to perform pixel-shader DCT for YUV channels in a pictorial block.

Quantization, which occurs in the scalar quantization module 618 of the technique, is essentially a division to DCT coefficients using quantizer step size. Generally, the JPEG quantization employed by the technique can be expressed as $$B_{j,k} = \text{round}\left(\frac{A_{j,k}}{Q_{j,k}}\right), \quad (1)$$

$$j = 0, 1, 2, \ldots, 7; k = 0, 1, 2, \ldots, 7$$

where A are the unquantized DCT coefficients and Q is the 2D quantization matrix containing quantizer steps and B are the quantized coefficients. In the GPU implementation for quantization, the technique packs quantization matrices of YUV channels into one 8×8 texture and upload the texture to video memory before encoding. The quantization steps of the YUV channels are respectively taken as RGB values in the texture.

Thus, in one embodiment, in the pixel shader for quantization, only two texture-accessing instructions are needed, one for unquantized coefficient vector and the other for quantizer step vector. Finally, one vector-division instruction is followed to obtain the per-pixel quantized YUV vector.

However, after quantization, the resultant coefficients are no longer within an 8-bit field. So, one issue that is addressed is how to fit the quantized coefficients to a compact representation for downloading to the CPU. Fortunately, alpha blending is not needed, so the technique can utilize the alpha (A) channel to contain partial coefficients of the YUV channels. Table 1 below depicts how the per-pixel YUV coefficients are organized into one RGBA 32-bit field in one working implementation. Though bitwise operators are not supported in Direct3D 9, High-Level Shader Language (HLSL), multiplication may be used to replace bit shifting in the shader.

TABLE 1

Organizing per-pixel YUV quantized coefficients to RGBA 32-bit fields.

| Bit Field | Denotations |
|---|---|
| A0 | Sign of Y channel |
| A1 | MSB of Y channel (Y8) |
| A2 | Sign of U channel |
| A3 | MSB of U channel (U8) |
| A4 | Sign of V channel |
| A5 | MSB of V channel (V8) |
| A6-A7 | Reserved |
| R0-R7 | LSBs of Y channel(Y0-Y7) |
| G0-G7 | LSBs of U channel(U0-U7) |
| B0-B7 | LSBs of V channel(V0-V7) |

3.4 Text Block Coding

Text block coding occurs in the text block compression module 620 of the GPU architecture employed by the technique shown in FIG. 6. In GPU-implemented text-block coding, in one embodiment, the technique first employs a block-to-block histogram generation procedure which utilizes a conventional vertex texture fetch (VTF) and hardware blending techniques. Then a two-stage major-color extraction procedure 622 is implemented as two successive rendering passes in GPU to obtain the major colors and an index 624.

A histogram within one block is easy to generate in a general-purpose CPU, for example through executing the program shown in Procedure 1.

Procedure 1 Histogram Computation in the CPU.

```
for each pixel within the block do
    Access the pixel value p;
    Histogram[p]++;
end for
```

However, histogram counting is a challenging task to a GPU, because the address written in the procedure is dependent on the pixel value. Therefore, this operation is not straightforward to implement in the fragment shader. Thus, the histogram computation employed in one embodiment of the technique provides for a block-to-block mapping. More specifically, one exemplary block-to-block histogram-generation procedure that can be employed is described as follows.

1. Set the histogram texture as render target and enable hardware blending for the render target.

2. Feed the GPU with point primitives in the text blocks. The pixel positions are taken as the texture coordinates of the point primitives.

3. The vertex shader computes the top-left position of the located block according to the input texture coordinate.

4. The vertex shader accesses the pixel value of the input texture and computes the offset relative to the top-left of the current block according to the pixel value.

5. The vertex shader returns the target position of the point by adding the block top-left position and the offset position.

6. The pixel shader simply returns 1.

After this rendering process, the histogram is stored in video memory as texture and can be accessed for the following major-color extraction procedures.

As previously mentioned, the task of the major-color extraction is to find the peak colors from the computed histogram for the current block. In order to utilize the fine-grained parallelism of the GPU, the technique employs a two-stage major-color extraction process based on histogramming. In the first stage, the technique searches out the maximal value in each row in the 16×16 histogram block. It can be implemented in the pixel shader of one rendering pass. The histogram texture (assuming the size is w×h) is binded as input texture and then the resultant texture as the render target of this rendering process will be of ($\frac{1}{16}$)w×h. One exemplary pseudo code for the pixel shader is detailed in Procedure 2. In this pixel shader, the technique employs 16 texture-accessing instructions and 15 comparison instructions to get the maximal one out of 16 values. The maximal value and the corresponding position are individually stored as color components into the render-target texture.

The above process results in 16 peak-like colors within each 16×16 histogram block. Then in the second stage, one more rendering pass is performed to extract the four major colors based on the peak-like colors. This is also implemented in the pixel shader. In this pass, the texture ($\frac{1}{16}$)w×h, which is the render target of the previous rendering pass, is binded as the input texture, and another texture at ($\frac{1}{16}$)w×($\frac{1}{16}$)h is set to the render target to store the final major colors for each block. The kernel of the pixel-shader implementation is to find the four most frequent pixels out of the 16 ones, which is elaborated in Procedure 3 and Procedure 4 below. For example, the function FIND4MAJORCOLORS in Procedure 4 takes the 16 peak-like pixels and their individual frequencies as input, and output one float4 vector to store the extracted 4 major-colors. One straightforward implementation of this function is to use iterative bubble-up algorithms to pop-up the four most-frequently-occurring pixels. In this case, the technique employs 54 (15+14+13+12) comparison operations. However it should be noted that the 4 major colors do not need to be in-order. So a more efficient method may be employed. First, the technique performs the bubble-up operation once among $\{P[j], j=0, 1, 2, 3\}$ and pops-up the least frequent pixel into P[3]. Then iterative comparisons take place between P[3] and $\{P[j], j=4, 5, \ldots, 15\}$. On the condition that the pixel in $\{P[j], j=4, 5, \ldots, 15\}$ is more frequent than P[3], P[3] is updated using this pixel and then the bubble-up operation is performed among $\{P[j], j=0, 1, 2, 3\}$ again; otherwise, no further operation is needed. In this way, the technique only needs 15 (3+12) comparison operations at the best case, even though at the worst case, only 51 (3+12+3*12) comparison operations are needed.

Procedure 2 The First Stage of GPU-Implemented Major-Color Extraction.

```
for each pixel in the render target do
    /* Here, corresponds to each 16×1 block in the histogram texture */
    /* Shader begin */
    Access the histogram values to the array H[16];
    Search the maximal value m out of H and record the index i;
    /* m equals to H[i]*/
    return float4(m, i, 0, 1);
    /* render RGBA data float4(r, g, b, a) to the target
    texture/back-buffer */.
    /* Shader end */
end for
```

Procedure 3 The Second Stage of GPU-Implemented Major-Color Extraction.

```
for each pixel in the render target do
    /* Here, corresponds to each 1×16 block in the texture containing
    (1/16)w×h peak-like pixels */
    /* Shader begin */
    Access the peak-like pixels to the array P[16];
        for i = 0 to 15 do
            P[i].g += i *16;
        end for
    return FIND4MAJORCOLORS(P); /* see Procedure 4 */
    /* Shader end */
end for
```

As the major colors of YUV channels are all extracted and stored as textures respectively, color-index selection is performed by another render-to-texture rendering pass. The original screen texture and the major-color textures are binded as input textures. Because the index selection is the per-pixel operation, it is implemented in the pixel shader, whose detail is elaborated in Procedure 5. In this procedure, windowing on the histogram, as shown in FIG. 3 bottom left is performed after selecting the best index. In one exemplary embodiment, the size used in windowing, i.e., the constant WIN_LEN in Procedure 5, is typically set to 8. After index selection and windowing, the indices and the escape codes are packed into one RGBA 32-bit vector and ready for reading back into CPU for entropy coding.

Procedure 4 Find 4 Major Colors.

```
function FIND4MAJORCOLORS(in float4 P[16])
begin
    /* bubble up once to get the minimal value of {P[j], j =
    0, 1, 2, 3} and store into P[3]*/
    for j = 0 to 2 do
        if P[j].r < P[j + 1].r then
            P[j] ↔ P[j + 1]
        end if
    end for
    /* compare between P[i] and P[3], 4 ≤ i ≤ 15*/
    for i = 4 to 15 do
        if P[i].r > P[3].r then
            P[3] ← P[i]       /* update P[3]*/
            /* bubble up again among {P[j], j = 0, 1, 2, 3} */
            for j = 0 to 2 do
                if P[j].r < P[j + 1].r then
                    P[j] ↔ P[j + 1]
                end if
            end for
        end if
    end for
    return float4(P[0].g, P[1].g, P[2].g, P[3].g)
end
```

Procedure 5 The Pixel Shader For Index Selection.

```
for each pixel in the render target do
    /* Shader begin */
    Access the major-color vector of Y channel into M_y;
    Access the major-color vector of U channel into M_u;
    Access the major-color vector of V channel into M_v;
    Access the pixel p;
    e_y = 0; e_u = 0; e_v = 0; /* escape codes */
    idx_y = 0; idx_u = 0; idx_v = 0;
    /* Select the index for Y channel */
    dist = 0, min_dist = abs(M_y[0] – p.r);
    for i = 1 to 3 do
        dist = abs(M_y[i] – p.r) ;
        if dist < min_dist then
            min_dist = dist, idx_y = i;
        end if
    end for
    if min_dist >(1/2)WIN_LEN then
        e_y = min(p.r + 1, 255);
    end if
    /* Select the index for U channel */
    ...
    /* Select the index for V channel */
    ...
    return float4(idx_y + idx_u* 4 + idx_v* 16, e_y, e_u, ev)
    /* Shader end */
end for
```

3.5 Bandwidth Reduction

As mentioned previously, the read back bandwidth from GPU to CPU is much slower than the reverse order. So, in one embodiment, the technique individually employs pixel packing in pictorial/text blocks to reduce the read back bandwidth to half.

In pictorial blocks, in one embodiment, since the technique uses YUV 4:2:0 subsampling format, in one embodiment, the U/V channels in odd positions are not used in the quantized-coefficient texture. So, the technique can easily pack pixels to more compact representation. The U/V channels in odd positions are used to place the coefficients of Y channels. As a result, the resolution of the quantized-coefficient texture is reduced to half.

Figure 8:
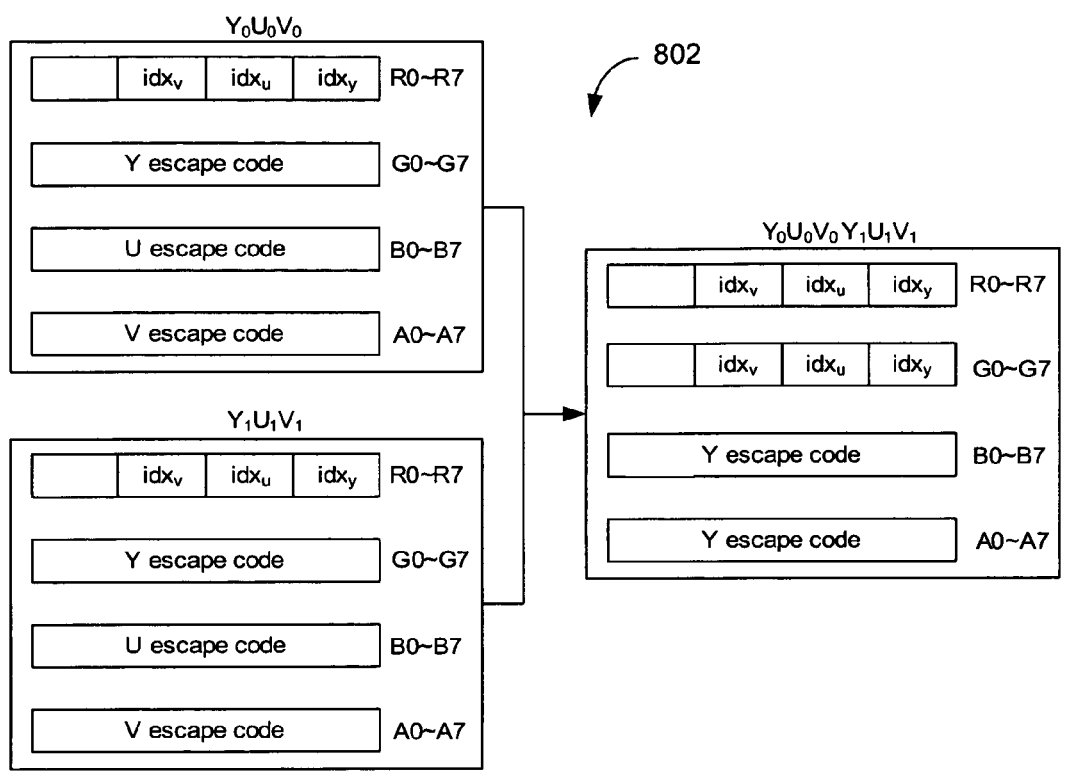
FIG. 8 depicts an illustration of pixel packing in pictorial blocks employed in one embodiment of the accelerated screen codec technique.

Because the resultant texture after GPU text coding is the same one as the quantized-coefficient texture, the technique also packs the text-coded symbols to half of original size to be consistent with the image blocks. In text blocks, the technique packs the two YUV pixels (represented by 32-bit RGBA) to one 32-bit data element. The packing process 802 is illustrated in FIG. 8. In this process, the escape codes for chroma channels are thrown away and the escape codes for luminance is preserved. This is reasonable in text content, because the number of the chroma values is usually limited and converged, and the 2-bit index is usually enough to represent the chrominance channel. Visual results indicate that discarding the escape codes of chrominance channels does not introduce visible quality loss.

2.0 The Computing Environment

The accelerated screen codec technique is designed to operate in a computing environment. The following description is intended to provide a brief, general description of a suitable computing environment in which the accelerated screen codec technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 9:
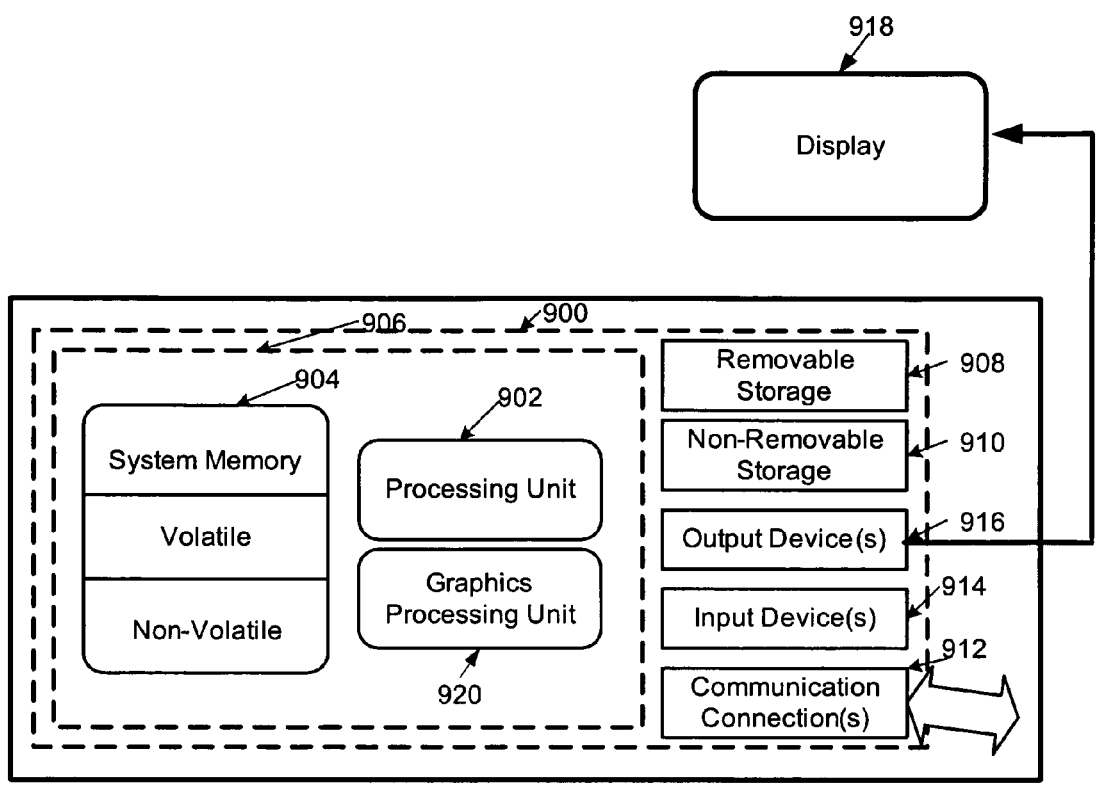
FIG. 9 is a schematic of an exemplary computing device in which the present accelerated screen codec technique can be practiced.

FIG. 9 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 9, an exemplary system for implementing the accelerated screen codec technique includes a computing device, such as computing device 900. In its most basic configuration, computing device 900 typically includes at least one processing unit 902 and memory 904. The computing device 900 also has a graphics processing unit 920 to aid in accelerating graphics rendering, among other functions. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 has a display 918, and may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may have various input device(s) 914 such as a keyboard, mouse, pen, camera, touch input device, and so on. Output device(s) 916 such as speakers, a printer, and so on may also be included. All of these devices are well known in the art and need not be discussed at length here.

The accelerated screen codec technique may be described in the general context of computer-executable instructions, such as program modules, being executed by a computing device. Generally, program modules include routines, programs, objects, components, data structures, and so on, that perform particular tasks or implement particular abstract data types. The Accelerated screen codec technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process to display images of one or more objects on a computer display, comprising:
   inputting a current screen image;
   dividing the current screen image and a previous screen image into corresponding blocks;
   for each set of corresponding blocks,
      comparing the current screen image to the previous screen to determine the differences in the corresponding blocks;
         if there are no differences in the corresponding blocks of the previous screen image and the current screen image, flagging a current block to be compressed like a previous block;
         if there are differences in the corresponding blocks of the previous screen image and the current screen image, determining if the current block is a text block or a pictorial block;
         if the current block is determined to be a pictorial block, flagging the block to be compressed using a compression scheme for compressing images;
         if the current block is determined to be a text block, flagging the block to be compressed using a compression scheme for compressing text; and
   compressing each of the blocks of the current screen image in accordance with flagged type.

2. The computer-implemented process of claim 1 further comprising entropy encoding each compressed block.

3. The computer-implemented process of claim 1 wherein compressing a text block further comprises converting the text block into a spatial domain comprising a set of major colors and an index map.

4. The computer-implemented process of claim 3 further comprising:
   histogramming pixel colors in the text block;
   selecting the pixel colors with peak histograms as the major colors; and
   quantizing all colors in the text block that are in a range near a major color as belonging to that near major color to compress the text block.

5. The computer-implemented process of claim 4 further comprising using the quantized colors to create the index map where each major color is represented as a different number.

6. The computer-implemented process of claim 1 wherein compressing a pictorial block further comprises compressing the pictorial block in a JPEG format.

7. The computer-implemented process of claim 1, wherein determining if the current block is a text block or a pictorial block further comprises:
for all pixels in the current block, determining the gradient between each pixel and its surrounding pixels;
selecting relative high gradient values in the current block;
counting the high gradient values in the current block;
if the pixel count of the high gradient values exceeds a given threshold specifying the current block as a text block, else specifying the current block as a pictorial block.

8. The computer-implemented process of claim 1 wherein compressing each of the blocks occurs in real time.

9. The computer-implemented process of claim 1 wherein the input screen image is in RGB format and wherein the input screen image is converted to YUV format.

10. A system for capturing data on a computer display, comprising:
a general purpose computing device;
a computer program comprising program modules executable by the general purpose computing device, wherein the computing device is directed by the program modules of the computer program to,
receive a current screen image displayed on a computer display;
on a graphics processing unit, for all blocks of data in the current screen image,
comparing the current screen image of the computer display to a previous screen image of a computer display to determine differences in corresponding blocks of the previous and current screen image;
if there are no differences in a corresponding block of the previous screen image and the current screen image block, compressing the current screen image block like a previous corresponding block;
if there is a difference in the corresponding block of the previous screen image and the current screen image block, determining if the current screen image block is a text block or a pictorial block;
if the current screen image block is determined to be a pictorial block, compressing the current screen image block using a compression scheme for compressing images;
if the current screen image block is determined to be a text block, compressing the current screen image block using a compression scheme for compressing text; and
at the computer processing unit, entropy coding each compressed block.

11. The system of claim 10 further comprising determining differences in corresponding blocks of the previous screen image and current screen image by employing a pixel shader of the graphics processing unit.

12. The system of claim 10 wherein entropy encoding for the previous screen image and compression of the blocks of the current screen image occur in parallel.

13. The system of claim 10 further comprising using downsampling to accelerate the difference determination.

14. The system of claim 10 further comprising determining if the current screen image block is a text block or a pictorial block by employing a pixel shader in the graphics processing unit.

15. The system of claim 10 further comprising compressing a text block by converting the text block into a spatial domain comprising a set of major colors and an index map.

16. The system of claim 15 further comprising using a pixel shader of the graphics processing unit to compress the pictorial block.

17. A system for capturing data on the screen of a computing device, comprising:
a general purpose computing device;
a computer program comprising program modules executable by the general purpose computing device, wherein the computing device is directed by the program modules of the computer program to,
receive a current screen image displayed on the computing device;
on a graphics processing unit, for all blocks of data in the current screen image,
comparing the current screen image of the computer display to a previous screen image of a computer display at a pixel shader of the graphics processing unit to determine differences in corresponding blocks of the previous screen image and current screen image;
if there are no differences in the corresponding blocks of the previous screen image and the current screen image, compressing a current image block like a previous corresponding block;
if there is a difference in the corresponding block of the previous screen image and the current screen image block, determining if the current image block is a text block or a pictorial block using the pixel shader of the graphics processing unit and gradients of pixels within the current screen image block;
if the current image block is determined to be a pictorial block, compressing the current image block using the pixel shader of the graphics processing unit using a compression scheme for compressing images;
if the current image block is determined to be a text block, compressing the current image block using a compression scheme for compressing text; and
at a computer processing unit, entropy coding each compressed block.

18. The system of claim 17 wherein using gradients of pixels within the blocks to determine if the current image block is a text block or a pictorial block further comprises:
for all pixels in the current image block, determining the gradient between each pixel and its surrounding pixels;
selecting relative high gradient values in the current image block;
counting the pixel values with high gradient values in the current image block;
if the pixel count of the high gradient values exceeds a given threshold electing the current image block as a text block, else specifying the current image block as a pictorial block.

19. The system of claim 17 wherein compressing a text block, further comprises:
histogramming pixel colors in the text block;
selecting the pixel colors with peak histograms as the major colors;

quantizing all colors in the block that are in a range near a major color as belonging to that near major color to compress the text block; and using the quantized colors to create an index map where each major color is represented as a different number.

20. The system of claim 17 further comprising packing pixels of blocks sent between the computer processing unit and the graphics processing unit to reduce bandwidth cost.

* * * * *